US006839718B2

(12) United States Patent
Heddings et al.

(10) Patent No.: US 6,839,718 B2
(45) Date of Patent: Jan. 4, 2005

(54) CONFIGURABLE PERSISTENCE IN APPLETS

(75) Inventors: Jason A. Heddings, Erie, CO (US); Chad A. Schoettger, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 418 days.

(21) Appl. No.: 10/138,159

(22) Filed: May 1, 2002

(65) Prior Publication Data

US 2003/0208476 A1 Nov. 6, 2003

(51) Int. Cl.[7] .............................................. G06F 17/30
(52) U.S. Cl. ..................................... 707/104.1; 707/10
(58) Field of Search .............................. 707/1, 3, 7, 10, 707/104.1, 205; 345/419; 370/448; 341/51; 705/1; 709/227, 231, 236; 715/500.1, 501.1, 523; 717/108; 725/931

(56) References Cited

U.S. PATENT DOCUMENTS

| 5,467,472 A | * | 11/1995 | Williams et al. ................ 707/1 |
| 6,658,625 B1 | * | 12/2003 | Allen .......................... 715/523 |
| 2002/0103818 A1 | * | 8/2002 | Amberden .................... 707/205 |

OTHER PUBLICATIONS

Jan Kleindienst, Lessons Learned from Implementing the COBRA Persistent Object Service, 1996 ACM, pp. 150–167.*

Advanced Distributed Learning, Sharable Content Object Reference Model (SCORM ™), Version 1.2 "The SCORM Content Aggregation Model", Oct. 1, 2001 © 2001, Pages 180.
Advanced Distributed Learning, Sharable Content Object Reference Model (SCORM ™), Version 1.2 "The SCORM Addendums", Nov. 9, 2001, © 2001.
Advanced Distributed Learning, Sharable Content Object Reference Model (SCORM ™), Version 1.2 "The SCORM Run–Time Environment", Oct. 1, 2001, © 2001.
Advanced Distributed Learning, Sharable Content Object Reference Model (SCORM ™), Version 1.2 "The SCORM Overview", Oct. 1, 2001, © 2001.

* cited by examiner

Primary Examiner—Diane D. Mizrahi
Assistant Examiner—Apu M Mofiz
(74) Attorney, Agent, or Firm—Blakely Sokoloff Taylor & Zafman LLP

(57) ABSTRACT

Disclosed are novel methods and apparatus for providing configurable persistence in applets. In an embodiment, an apparatus for persisting data is disclosed. The apparatus includes: a persistence manager module, a persistent element, and a stream generator module. The persistence manager module may receive a data path request from the persistent element. The persistence manager module may resolve at least one token present in a data path provided by the persistent element. The stream generator module may correspond to a type of data provided by the persistent element. The persistence manager may further activate the stream generator module. In a further embodiment, the persistent element persists data based on a result of a persistence stream request.

30 Claims, 3 Drawing Sheets

CONFIGURABLE PERSISTENCE IN APPLETS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright© 2002, Sun Microsystems, Inc., All Rights Reserved.

FIELD OF INVENTION

The present invention generally relates to the field of applets. More specifically, an embodiment of the present invention provides for configurable persistence in applets.

BACKGROUND OF INVENTION

As computers become more commonplace in everyday life, so do the demands on the functionality they provide. As such, computer programs are increasingly growing in size resulting in program bloat, data corruption, and "spaghetti" code. A very popular solution to these problems is provided through applets. An applet is generally a small part of an application that can be distributed economically. For example, an applet may display a form on a computer screen, spell-check a document, or refill a prescription. Programs written in Java language are often organized into applets. Applets can be interpreted at run-time, in part, because of their relatively small size.

With the growth of the number of applets in the present day computer systems and the increase in the number of computing devices being utilized at various locations (including remote locations), provision of persistence storage poses a great problem to the software industry. Persistence storage is generally considered as a non-volatile memory capable of storing data, for example, between invocations of a program. Databases and file systems are two common examples of persistent storage. Given the unique characteristics of applets, there is a need to save data (such as the applet state) for each applet. Accordingly, it is often necessary to be able to save this data in a manner unique to each instance of an applet. But, it is impractical to write special code for every applet instance that may occur. These problems are illustrated by the issues associated with storing data on a local file system versus a network file system versus a Web server versus a database.

SUMMARY OF INVENTION

The present invention, which may be implemented utilizing a general-purpose digital computer, in certain embodiments, includes novel methods and apparatus to provide configurable persistence in applets. In an embodiment, an apparatus for persisting data is disclosed. The apparatus includes: a persistence manager module, a persistent element, and a stream generator module. The persistence manager module may receive a data path request from the persistent element. The persistence manager module may resolve at least one token present in a data path provided by the persistent element. The stream generator module may correspond to a type of data provided by the persistent element. The persistence manager may further activate the stream generator module. In a further embodiment, the persistent element persists data based on a result of a persistence stream request.

In another embodiment, a method of persisting data is disclosed. The method includes: providing a persistence manager module, the persistence manager module receiving a data path request from a persistent element, the persistence manager module resolving at least one token present in a data path provided by the persistent element, the persistent element sending a stream generator request to the persistence manager module, the persistence manager module providing a stream corresponding to a type of data provided by the persistent element, the persistent element sending a persistence stream request based on the provided type stream, and the persistent element persisting data based on a result of the persistence stream request.

BRIEF DESCRIPTION OF DRAWINGS

The present invention may be better understood and its numerous objects, features, and advantages made apparent to those skilled in the art by reference to the accompanying drawings in which.

The use of the same reference symbols in different drawings indicates similar or identical items.

DETAILED DESCRIPTION

In the following description, numerous details are set forth. It will be apparent, however, to one skilled in the art that embodiments of the invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
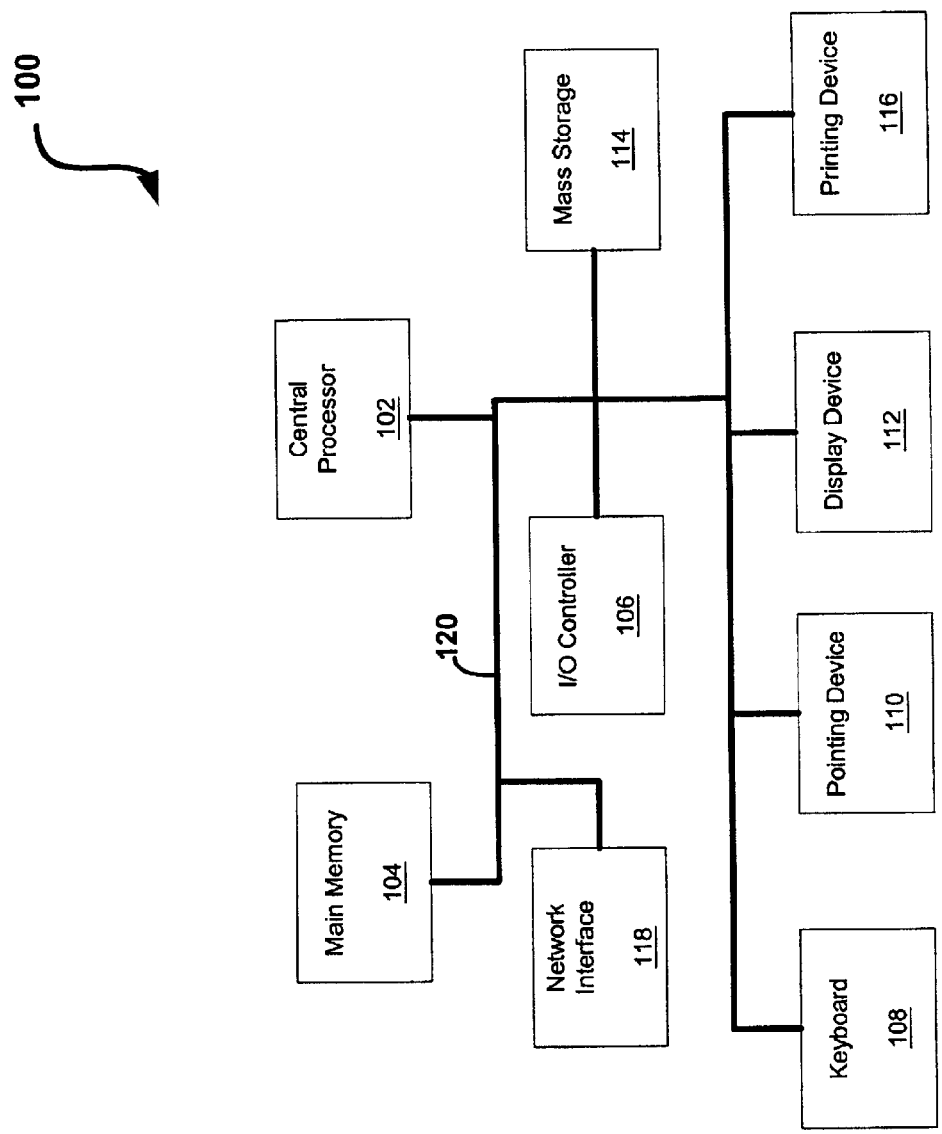
FIG. 1 illustrates an exemplary computer system 100 in which the present invention may be embodied.

FIG. 1 illustrates an exemplary computer system 100 in which the present invention may be embodied in certain embodiments. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., a nonvolatile storage such as a hard disk, an optical drive, and the like), and a network interface 118. Additional input/output devices, such as a printing device 116, may be included in the system 100 as desired. As illustrated, the various components of the system 100 communicate through a system bus 120 or similar architecture.

In an embodiment, the computer system 100 includes a Sun Microsystems computer utilizing a SPARC microprocessor available from several vendors (including Sun Microsystems of Palo Alto, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments, the network interface 118 can be implemented utilizing technologies including, but not limited to, Ethernet, Fast Ethernet, wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, time division multiplexing (TDM), universal serial bus (USB and its varieties such as USB II), asynchronous transfer mode (ATM), satellite, cable modem, and/or FireWire.

Moreover, the computer system 100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), and the like. Also, it is envisioned that in certain embodiments, the computer system 100 is a general purpose computer capable of running any number of applications such as those available from companies including Oracle, Siebel, Unisys, Microsoft, and the like.

Figure 2:
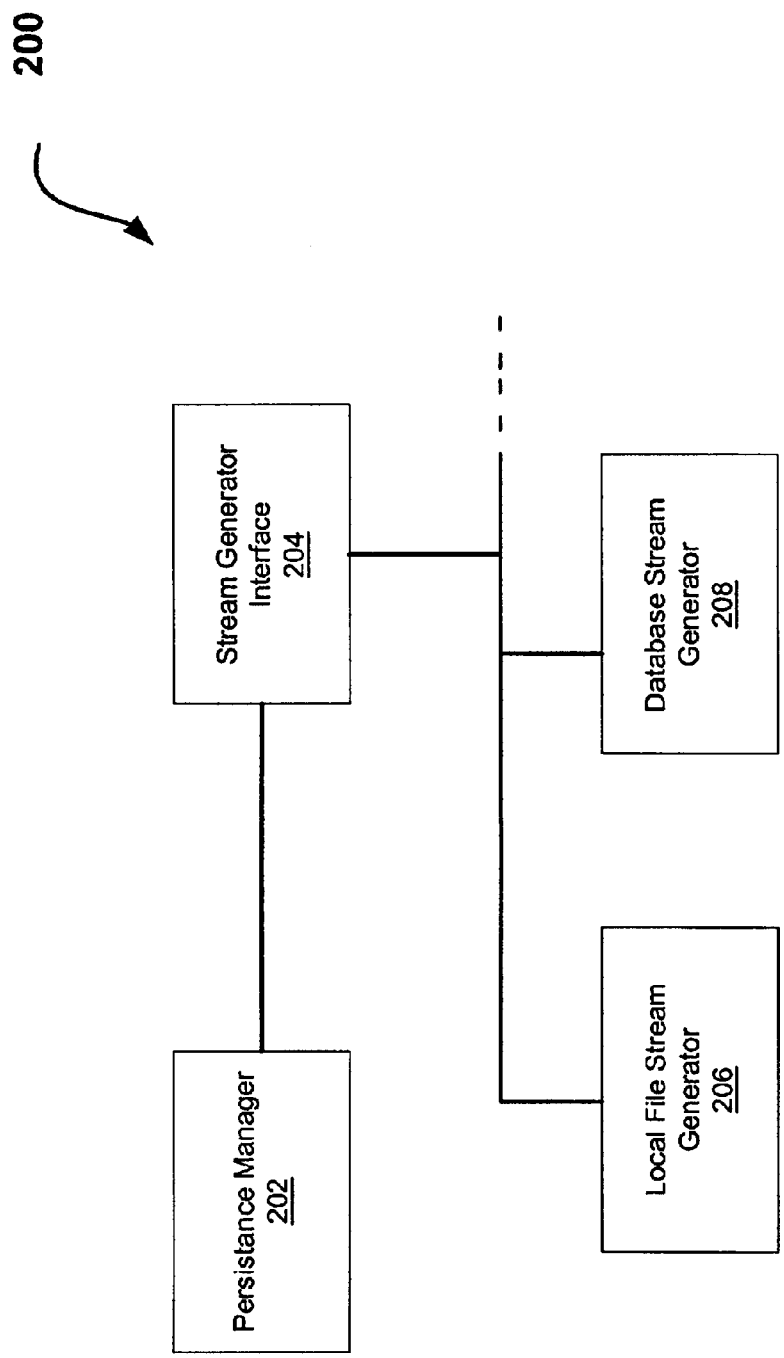
FIG. 2 illustrates an exemplarily configurable persistence system 200 in accordance with an embodiment of the present invention.

FIG. 2 illustrates an exemplarily configurable persistence system 200 in accordance with an embodiment of the present invention. The system 200 includes a persistence manager module 202, which may communicate with a persistence-initiating applet, for example, through a Web browser application (such as the Internet Explorer available from Microsoft Corporation of Redmond, Wash., and Netscape Navigator available from various sources including iPlanet, now a division of Sun Microsystems, Inc., of Palo Alto, Calif.). For example, the persistence manager 202 may receive a save and/or load command from the persistence-initiating applet, for example, initiated at runtime by the applet. The persistence manager 202 can then define a path for the data to be read or stored by the persistence-initiating applet. In one embodiment, the persistence manager 202 is coupled to a stream generator interface 204. The stream generator interface 204 may provide an interface for the persistence manager 202 to obtain input and/or output streams from other modules of the system 200 (e.g., in form of strings which can be used by the persistence-initiating applet).

Furthermore, the stream generator interface 204 can be coupled to a plurality of stream generators including a local file stream generator 206 and a database stream generator 208. In accordance with an embodiment of the present invention, a database is envisioned to include any collection of data that is organized for collection and/or retrieval. In one embodiment, the plurality of stream generators may be implemented as objects. An object is generally an in-memory representation of a single instance of a class. The local file stream generator 206 may provide information to the persistence manager 202, for example, through the stream generator interface 204. Such data may include a data path appropriate for a local file stream. Similarly, the database stream generator 208 may provide a data path appropriate for a database stream to the persistence manager 202, for example, through the stream generator interface 204. The database stream generator 208 is further envisioned to perform other tasks that may be required for persisting to a database including connecting to the database and setting up the communication for read and/or write operations to the database.

Accordingly, the system 200 is highly configurable, in part, because each type of stream generator unit can be divided into a separate module (e.g., class), which can be independently updated, debugged, and/or generated (e.g., coded). It is envisioned that if a new media type is to be utilized, a new class that implements the appropriate stream generator function can be provided so that the persistence manager 202 can load it, for example, through the stream generator interface 204. Other media types contemplated for the stream generator units include intranet and Internet servers. In one embodiment, the persistence manager 202 may load the stream generators directly.

Figure 3:
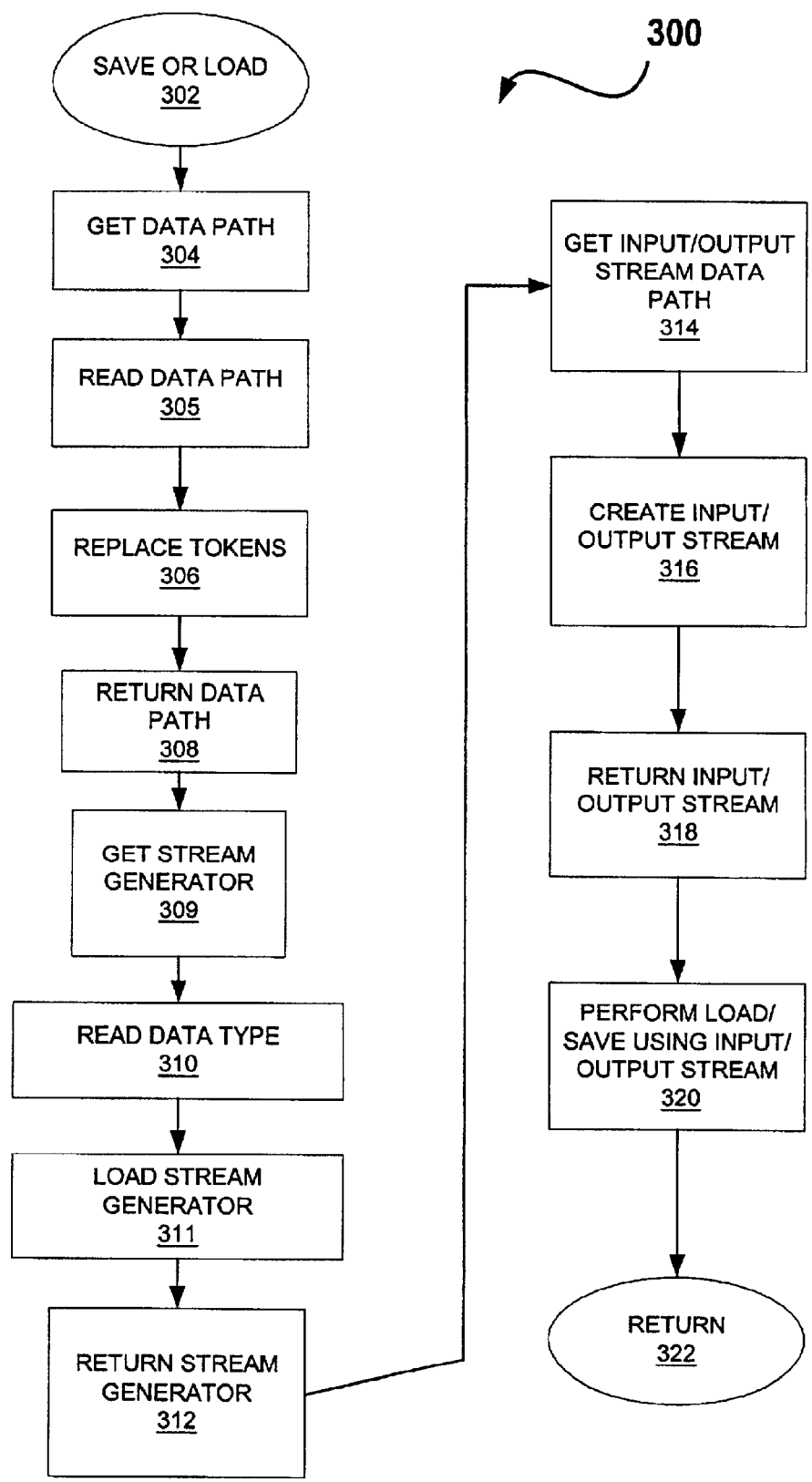
FIG. 3 illustrates an exemplarily flow diagram of a method 300 in an accordance with an embodiment of the present invention.

FIG. 3 illustrates an exemplarily flow diagram of a method 300 in an accordance with an embodiment of the present invention. The method 300 starts in a step 302 when a save or load command is received, for example, from a persistence-initiating applet or object. The save/load command may be invoked periodically (e.g., by utilizing a counter and/or timer) to save/load data and/or maintain synchronization. In an embodiment, the save/load command may be initiated by an object, which wishes to save or load data according to a current persistence configuration. In a step 304, a request for obtaining the appropriate data path for the save/load commend is made. In an embodiment, the get data path of step 304 may be issued to the persistence manager module 202 of FIG. 2. In a step 305, the data path is read, for example, from the data provided by the persistence-initiating applet. A step 306 replaces the tokens in the provided data path.

In one embodiment, the steps 305 and 306 may be performed by the persistence manager module 202 of FIG. 2. Moreover, tokens may be predefined and exist in the path passed by the persistence-initiating applet, for example. Tokens are simply considered as placeholders in the data path, for example, for run time-specific information (i.e., % file_separator % will be replaced with the current operating system's character for delimiting directories, % course_id % will be replaced with the current course identity launched by the persistence-initiating applet, and the like). A user may also provide tokens, for example, if the token % user_name % is unknown to the persistence manager module 202. In such a case, the user may provide the value for the token in the parameters past to the persistence manger module 202 of FIG. 2. "%" symbol is simply used herein as an example. It is envisioned that other types of symbols may be utilized to denote a token in the strings passed between the modules discussed herein.

A step 308 returns the processed data path to the element that invokes the step 304. In one embodiment, the data path may be selected from items including a local file path, a uniform resource locator (URL), a database path, a server path, a Java naming and directory interface (JNDI) directory, a common object request broker architecture (CORBA) directory, an enterprise Java bean (EJB) path, an Extensible markup language (XML) path, and the like. In a step 309, a stream generator request is made. In an embodiment, the stream generator may be requested by the same element that invokes the step 304. A step 310 reads the data type, for example, from the persistence-initiating applet. The data type identifies the type of data path. The data type may include a local file (which, in an embodiment, may sometimes be connected to a server for example at an office or through the Internet), a corporate file system (such as a network file system (NFS) and/or shared area), an Internet Web server, for example, with a signed Java application resource (JAR), other types of storage discussed with respect to FIG. 1, an Oracle database, the genetic code of a poisonous tree dart frog, and the like.

In an embodiment, access behind a firewall may provide a more efficient means of communication. For example, a socket may be opened to the server directly from the applet instead of going through hypertext transfer protocol (HTTP). The faster connection is in part established because it is not required to create a new request every time the applet needs to open and close a connection. With respect to the step 310, the appropriate stream generator may be selected from the plurality of stream generators discussed with respect to FIG. 2 (including 206 and 208) in an embodiment. Furthermore, the stream generator interface 204, in an embodiment, may use the data type to route the request to the appropriate stream generator units (e.g., 206 and 208).

A step 311 loads the appropriate stream generator. In an embodiment, the steps 310 and 311 may be performed by the persistence manager module 202 of FIG. 2. In a step 312, the requested stream generator is returned to the element that invokes the steps 310 and/or 311. A step 314 requests an input/output stream data path. The step 314, in an embodiment, may be invoked by the persistence-initiating applet and/or the element that invokes the steps 302 and/or 309. A step 316 creates the input/output stream. The step 316 may be implemented based on information extracted from the data path, for example, based on the data path type determined in the step 310. A step 318 returns the results of the request of the step 314 back with an appropriate stream to the element that invokes the step 314 (such as the persistence-initiating applet). In an embodiment, the steps 316 and 318 may be performed by the stream generators discussed with respect to FIG. 2 (for example, the stream generator interface 204 and/or the stream generators 206 and 208). In a step 320, the actual load/save operation is performed by utilizing the returned input/output stream of the step 318. The method 300 ends in step 322.

In accordance with an embodiment of the present invention, a system is provided with a flexible, extensible, and ultimately configurable persistence mechanism for maintaining applet information. Rather than the applet saving the data to the user-selected media, an embodiment of the present invention delegates this responsibility to a persistence manager module. It is up to the persistence manager module to decide what media to use for storing the desired data, and the location of the selected media. The persistence manager module may examine the data path (e.g., the user-configurable location of the media) to determine where to find the media. In examining this path, the persistence manager module may replace any predefined tokens that may exist in the data path.

In a further embodiment, the persistence manager 202 of FIG. 2 looks up the name of the class to load that is to handle the data type at hand. The persistence manager 202 may also provide the data path to the appropriate class, which then handles the data path. In another embodiment, the persistence manager determines the data type (the user-configurable identifier for the type of media to use) to store the data. The persistence manager module may read the data type passed in by the persistence-initiating element (e.g., an object or applet) and load the appropriate class that understands the specified media type. In an embodiment, the persistence manager module may accomplish this by using a predefined naming convention. For example, if the data type were set to "local-file" then the persistence manager would look for the local file stream generator module. In such a case, it is the stream generator's job to provide the appropriate input and output streams for the defined media type.

Furthermore, in an embodiment, the techniques of the present invention may be applied to sharable content object reference model (SCORM) implementations including, for example, courseware applications. In the SCORM context, the embodiments of the present invention may be utilized to save a user's progress through a course for example. This can be especially useful when a user does not have access to a learning management system (LMS). An LMS generally includes solutions for cataloging, course registration, provision of a course, tracking (for example, by managers), and accounting. Such an LMS is typically a large software system, which can easily cost over $100,000. In most cases, an LMS is too costly for one user or cannot be run locally on a client's system, which may lack the necessary local resources.

Moreover, it is envisioned that, in an embodiment, the user's progress through the course may be tracked by utilizing the content structure format (CSF) hierarchy of blocks and sharable content objects (SCOs) defining the structure of a given course in accordance with the SCORM standard. The SCORM standard is hereby incorporated herein by reference for all purposes. Further information regarding the SCORM standard may be found by reference to www.adlnet.org.

The foregoing description has been directed to specific embodiments. It will be apparent to those with ordinary skill in the art that modifications may be made to the described embodiments, with the attainment of all or some of the advantages. For example, the techniques of the present invention may be applied to computer-based and/or electronic gaming technologies. Therefore, it is the object of the appended claims to cover all such variations and modifications as come within the spirit and scope of the invention.

What is claimed is:

1. A method of persisting data, the method comprising:
   providing a persistence manager module, the persistence manager module receiving a data path request from a persistent element;
   the persistence manager module resolving at least one token present in a data path provided by the persistent element;
   the persistent element sending a stream generator request to the persistence manager module;
   the persistence manager module providing a stream corresponding to a type of data provided by the persistent element;
   the persistent element sending a persistence stream request based on the provided type stream; and
   the persistent element persisting data based on a result of the persistence stream request.

2. The method of claim 1 wherein the provided type stream includes an identity of a stream generator module.

3. The method of claim 2 wherein the stream generator module is selected from a group comprising a local file stream generator module, a database stream generator module, an Internet Web server stream generator module, an intranet stream generator module, a URL stream generator module, a server stream generator module, a JNDI stream generator module, an EJB stream generator module, an XML stream generator module, and a CORBA stream generator module.

4. The method of claim 2 wherein the stream generator module includes a stream generator interface having access to a plurality of stream generators, each of the plurality of stream generators providing appropriate streams for accessing data in a storage device.

5. The method of claim 4 wherein the storage device is selected from a group comprising a local file, a corporate file system, an Internet Web server, and an Oracle database.

6. The method of claim 4 wherein the accessing of data in the storage device is an operation selected from a list comprising reading and writing.

7. The method of claim 4 wherein the plurality of stream generators are selected from a group comprising a local file stream generator module, a database stream generator module, an Internet Web server stream generator module, an intranet stream generator module, a URL stream generator module, a server stream generator module, a JNDI stream generator module, an EJB stream generator module, an XML stream generator module, and a CORBA stream generator module.

8. The method of claim 1 further including returning the resolved data path to the persistent element.

9. The method of claim 1 further including the persistence manager activating a stream generator module corresponding to a type of data provided by the persistent element.

10. The method of claim 1 wherein the data path is contained within the persistent element data path request.

11. The method of claim 1 wherein the persistent element is selected from a group comprising an applet, an object, a program, and a procedure.

12. The method of claim 1 wherein the type of data provided by the persistent element includes a type of the data path.

13. The method of claim 12 wherein the data path type is selected from a group comprising a local file path, a URL, a database path, a server path, a JNDI directory, a CORBA directory, an EJB path, and an XML path.

14. The method of claim 1 wherein the persisted data includes data selected from a group comprising an applet parameter and an applet state.

15. The method of claim 1 wherein the persistent element data path request is selected from a group comprising save data and load data.

16. A system for persisting data, the system comprising:
   a persistence manager module;
   a persistent element, the persistence manager module receiving a data path request from the persistent element, the persistence manager module resolving at least one token present in a data path provided by the persistent element; and
   a stream generator module corresponding to a type of data provided by the persistent element, the persistence manager activating the stream generator module,
   wherein the persistent element persists data based on a result of a persistence stream request.

17. The system of claim 16 wherein the stream generator module is selected from a group comprising a local file stream generator module, a database stream generator module, an Internet Web server stream generator module, an intranet stream generator module, a URL stream generator module, a server stream generator module, a JNDI stream generator module, an EJB stream generator module, an XML stream generator module, and a CORBA stream generator module.

18. The system of claim 16 wherein the stream generator module includes a stream generator interface having access to a plurality of stream generators, each of the plurality of stream generators providing appropriate streams for accessing data in a storage device.

19. The system of claim 16 wherein the data path is contained within the persistent element data path request.

20. The system of claim 16 wherein the persistent element is selected from a group comprising an applet, an object, a program, and a procedure.

21. The system of claim 16 wherein the type of data provided by the persistent element includes a type of the data path.

22. The system of claim 21 wherein the data path type is selected from a group comprising a local file path, a URL, a database path, a server path, a JNDI directory, a CORBA directory, an EJB path, and an XML path.

23. The system of claim 16 wherein the persistent element data path request is selected from a group comprising save data and load data.

24. An article of manufacture comprising:
   a machine readable medium that provides instructions that, if executed by a machine, will cause the machine to perform operations including:
      providing a persistence manager module, the persistence manager module receiving a data path request from a persistent element;

the persistence manager module resolving at least one token present in a data path provided by the persistent element;

the persistent element sending a stream generator request to the persistence manager module;

the persistence manager module providing a stream corresponding to a type of data provided by the persistent element;

the persistent element sending a persistence stream request based on the provided type stream; and the persistent element persisting data based on a result of the persistence stream request.

25. The article of claim 24 wherein the provided type stream includes an identity of a stream generator module, the stream generator module being selected from a group comprising a local file stream generator module, a database stream generator module, an Internet Web server stream generator module, an intranet stream generator module, a URL stream generator module, a server stream generator module, a JNDI stream generator module, an EJB stream generator module, an XML stream generator module, and a CORBA stream generator module.

26. The article of claim 24 wherein the operations further include returning the resolved data path to the persistent element.

27. The article of claim 24 wherein the operations further include the persistence manager activating a stream generator module corresponding to a type of data provided by the persistent element.

28. An apparatus comprising:

persistence manager means;

persistent element means, the persistence manager means receiving a data path request from the persistent element means, the persistence manager means resolving at least one token present in a data path provided by the persistent element means; and stream generator means corresponding to a type of data provided by the persistent element means, the persistence manager means activating the stream generator means.

29. The apparatus of claim 28 further including means for accessing data in a storage device.

30. The apparatus of claim 28 further including means for returning the resolved data path to the persistent element means.

* * * * *